United States Patent
Ninose et al.

(10) Patent No.: US 7,334,155 B2
(45) Date of Patent: Feb. 19, 2008

(54) REMOTE COPY SYSTEM AND REMOTE COPY METHOD

(75) Inventors: Kenta Ninose, Yokohama (JP); Hiroshi Arakawa, Sagamihara (JP); Yoshihiro Asaka, Odawara (JP); Yusuke Hirakawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/477,415

(22) Filed: Jun. 30, 2006

(65) Prior Publication Data

US 2006/0248301 A1    Nov. 2, 2006

Related U.S. Application Data

(63) Continuation of application No. 10/929,380, filed on Aug. 31, 2004, now Pat. No. 7,076,621.

(30) Foreign Application Priority Data

Dec. 4, 2003 (JP) ............................. 2003-405331
Jun. 30, 2004 (JP) ............................. 2004-192534

(51) Int. Cl.
*G06F 12/16* (2006.01)
(52) U.S. Cl. ............................. 714/6; 714/5; 711/161; 711/162; 709/218; 709/217; 709/219
(58) Field of Classification Search ............... None
See application file for complete search history.

(56) References Cited

U.S. PATENT DOCUMENTS 6,247,099 B1   6/2001   Skazinski et al.
6,301,643 B1   10/2001  Crockett et al.
6,304,980 B1   10/2001  Beardsley et al.
6,463,501 B1   10/2002  Kern et al.
6,643,750 B2   11/2003  Achiwa et al.
6,694,413 B1   2/2004   Mimatsu et al.
6,701,455 B1   3/2004   Yamamoto et al.
6,779,093 B1   8/2004   Gupta
2002/0083281 A1   6/2002   Carteau
2002/0133735 A1   9/2002   McKean et al.
2003/0140070 A1   7/2003   Kaczmarski et al.
2004/0030837 A1   2/2004   Geiner et al.
2004/0078399 A1   4/2004   Tabuchi et al.

(Continued)

FOREIGN PATENT DOCUMENTS

EP    0 672 985 B1    5/1998

(Continued)

*Primary Examiner*—B. James Peikari
(74) *Attorney, Agent, or Firm*—Antonelli, Terry, Stout & Kraus, LLP.

(57) ABSTRACT

A storage control apparatus and a storage control method are provided wherein in a system having a plurality of disk systems and secondary disk systems at remote sites, the data transfer amount between a central processing unit and a disk system can be reduced when duplicate disk write is performed, the performance can be prevented from being degraded even if the distance between control units is elongated, and the intermediate results of a transaction are not left. A standard time is determined and a program is provided which instructs a secondary central processing unit to reflect only update information having a write time older than the standard time, upon a logical disk in the secondary disk system.

21 Claims, 11 Drawing Sheets

U.S. PATENT DOCUMENTS

| | | |
|---|---|---|
| 2004/0123180 A1 | 6/2004 | Soeiima et al. |
| 2004/0193625 A1 | 9/2004 | Sutoh et al. |
| 2004/0193658 A1 | 9/2004 | Kawamura et al. |
| 2004/0199733 A1 | 10/2004 | Watanabe et al. |
| 2004/0205391 A1 | 10/2004 | Thompson |
| 2004/0215878 A1 | 10/2004 | Takata et al. |
| 2005/0257015 A1 | 11/2005 | Hiraiwa et al. |

FOREIGN PATENT DOCUMENTS

| | | |
|---|---|---|
| EP | 0 902 370 A2 | 3/1999 |
| EP | 1 150 210 A2 | 10/2001 |
| EP | 1 217 523 A1 | 6/2002 |
| EP | 1 538 527 A2 | 6/2005 |
| JP | 2003-085017 | 3/2003 |
| WO | WO 94/00816 | 1/1994 |

α = [MAXIMUM TIME TAKEN FOR UPDATE INFORMATION REFLECTING
  PROGRAM a TO SUPPLY STANDARD TIME TO UPDATE INFORMATION
  REFLECTING UNITS a OF ALL SECONDARY DISK SYSTEMS]
  + [TIME DIFFERENCE BETWEEN TIMERS OF PRIMARY
  AND SECONDARY CPUs]

MINIMUM MARGIN = α × [SAFETY FACTOR (>1)]

REMOTE COPY SYSTEM AND REMOTE COPY METHOD

CROSS-REFERENCE TO RELATED APPLICATIONS

The present application is a continuation of U.S. Ser. No. 10/929,380, filed Aug. 31, 2004, now U.S. Pat. No. 7,076,621; said application also claims priority from Japanese applications JP 2003-405331 filed on Dec. 4, 2003, and JP 2004-192534 filed on Jun. 30, 2004, the entire contents of which are hereby incorporated by reference.

BACKGROUND OF THE INVENTION

1. Field of the Invention

The present invention relates to techniques facilitating remote copying between different disk systems.

2. Description of the Related Art

The specification of European Patent Publication No. 0672985 discloses writing techniques of a remote copy operation effected between disk systems at remote sites. According to the specification of European Patent Publication No. 0672985, a primary disk system, receiving a write request directly from a computer (hereinafter called a primary CPU) executing an application, reports a write request completion to the primary CPU immediately after the write request process. Further, a copy of the write request received at the primary disk system is read by the primary CPU. A write request issued from the primary CPU includes a time when the primary CPU issued the write request. When the copy of the write request is read by the primary CPU, the write time is also passed to the primary CPU. The read copy of the write request is sent from the primary CPU to a computer (hereinafter called a secondary CPU) at a remote site.

The secondary CPU receiving the copy of the write request and the write time writes the write data in the write request in the order of write time, in a secondary disk system connected to the secondary CPU.

According to the invention described in the specification of European Patent Publication No. 0672985, it is possible to avoid or prevent leaving intermediate results of transactions generally used in an on-line system.

For example, not to leave intermediate results means to preclude a state or condition in which data integrity is not guaranteed between a system A and a system B, for example, when the system A executes a transaction of transmitting data to the system B, although the system A transmitted the data, the data is not written in the system B. Generally, in the on-line system, since the unit of data recovery is a transaction, leaving the intermediate results of a transaction is a very serious obstacle.

Next, a brief description will be made on the fact that if processes described in the specification of European Patent Publication No. 0672985 are executed, it is possible to avoid leaving the intermediate results of a transaction. The primary and secondary disk systems effecting remote copying have a disk for storing a database such as account information and a disk for storing a journal of an update history of each transaction.

When the primary CPU recovers after it crashes, a recovery process program at the primary CPU analyzes the journal in the primary CPU and executes processes such as a process of recovering the state before the start of transaction execution for the update results of an uncompleted transaction by using the journal, so that the intermediate results of the transaction are prevented.

Further, data written in the secondary disk system becomes valid, for example, when the primary disk system storing the latest data is broken. It is guaranteed that although the secondary disk system does not store the latest data, the write data in the write requests issued before a certain time are already written. Therefore, the intermediate results of a transaction can be prevented, if the secondary CPU executes a process similar to the recovery process which is executed when the primary CPU recovers after it crashes, by using the database and journal stored in the secondary disk system.

SUMMARY OF THE INVENTION

According to the specification of European Patent Publication No. 0672985, even if the distance between disk systems is elongated, the response performance, in which the primary CPU issues a write request to the primary disk system and receives the write request completion, is degraded less by transferring the write request to the secondary disk system after the primary disk system reports to the primary CPU the write request completion of the write request received from the primary CPU, and the intermediate results of the transaction are prevented.

However, since the primary CPU is required to read a write request and transfer data to the secondary CPU, data is transferred several times between CPUs and disk systems, resulting in a large transfer overhead.

The invention discloses, therefore, techniques of remote copying between disk systems while the data transfer amount between CPUs and disk systems is suppressed.

When a primary CPU issues a write request to a primary disk system, the primary CPU adds a write time to the write request. Upon reception of the write request from the primary CPU, the primary disk system reports a request completion to the primary CPU. Thereafter, the primary disk system sends the write request and write time to a secondary disk system.

The secondary CPU determines a standard time when write data in a write request received at the secondary disk system is written in a disk of the secondary disk system, and instructs the secondary disk system to write data in the write request having a write time equal to or before the standard time.

When a remote copy operation is performed between disk systems at remote sites, the write request is transferred directly between the disk systems so that the data transfer overhead between a CPU and a disk system can be suppressed. Further, it is possible to suppress degradation of the response performance that the primary CPU issues a write request to the primary disk system and receives the write request completion, by transferring the write request to the secondary disk system after the primary disk system reports to the primary CPU the write request completion of the write request received from the primary CPU. Furthermore, it is possible not to leave the intermediate results of a transaction even in a system constituted of a plurality of disk systems.

BRIEF DESCRIPTION OF THE DRAWINGS

FIG. 8 is a diagram showing an example of a process by an update information reflecting instruction program a.

FIG. 9 is a diagram showing an example of a calculation equation for a minimum margin used for standard time calculation.

DESCRIPTION OF THE EMBODIMENTS

Embodiments of the invention will be described with reference to the accompanying drawings. The invention is not limited to the embodiments.

First Embodiment

First, the first embodiment will be described.

Figure 1:
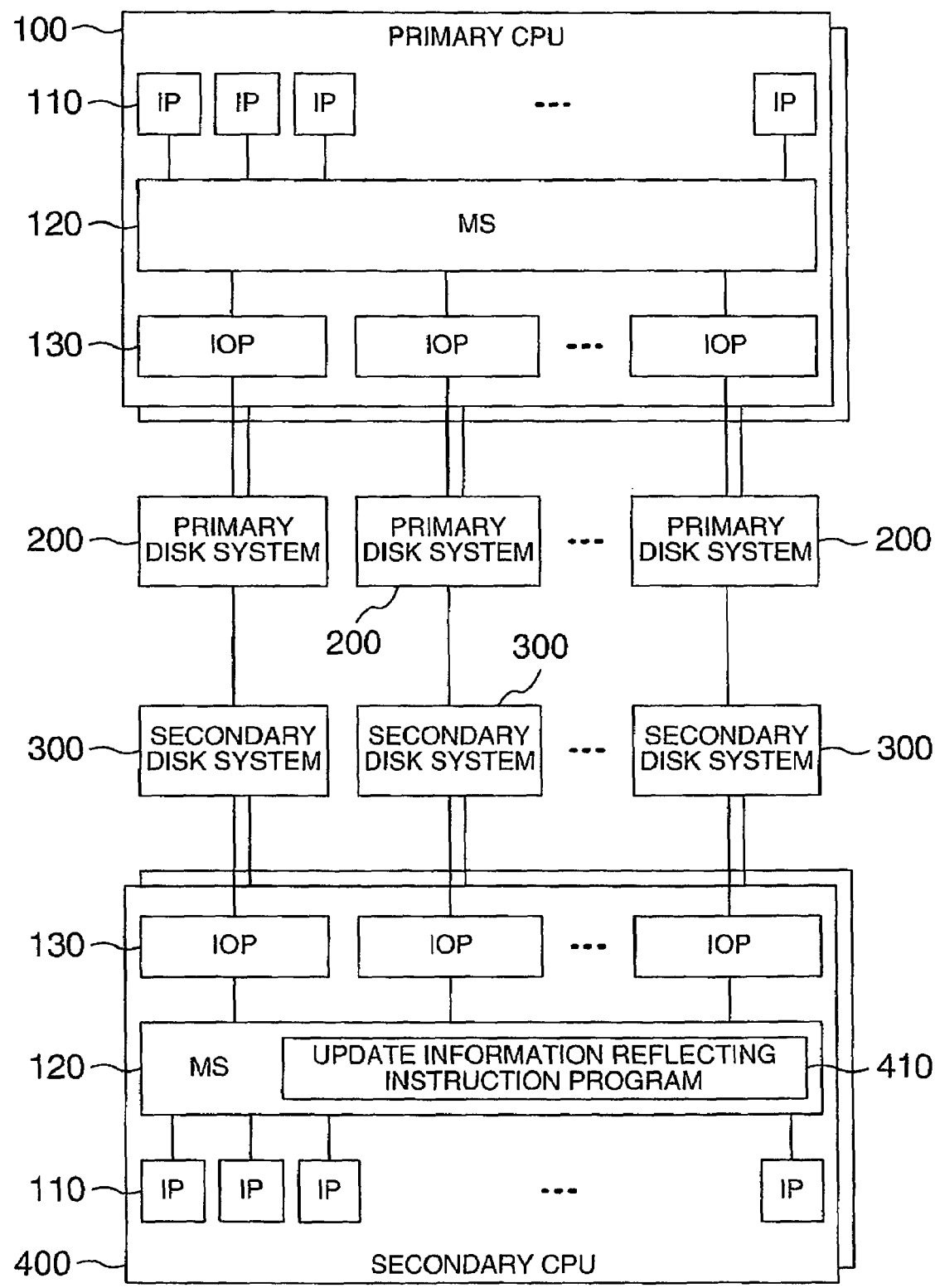
FIG. 1 is a diagram showing an example of a system configuration.

FIG. 1 is a diagram showing the whole configuration of a system according to the first embodiment.

A computer (hereinafter called a primary CPU) 100 has one main storage (hereinafter called an MS) 120, one or a plurality of instruction processors (hereinafter called an IP) 110 connected to MS 120, and one or a plurality of input/output processors (hereinafter called an IOP) 130 connected to MS 120. One or a plurality of disk systems (hereinafter called primary disk systems) 200 are connected to one or a plurality of primary CPUs 100 via IOPs 130. Each primary disk system 200 is connected to a corresponding disk system (hereinafter called a secondary disk system) 300. Each secondary disk system 300 is connected to one or a plurality of computers (hereinafter called secondary CPUs) 400. The hardware structure of the secondary CPU 400 is similar to that of the primary CPU 100, and has one or a plurality of IPs 110 and an MS 120 connected to one or a plurality of IOPs 130. MS 120 in the secondary CPU 400 includes an update information reflecting instruction program 410. The update information reflecting instruction program 410 is executed by IP 110 of the secondary CPU 400.

Figure 2:
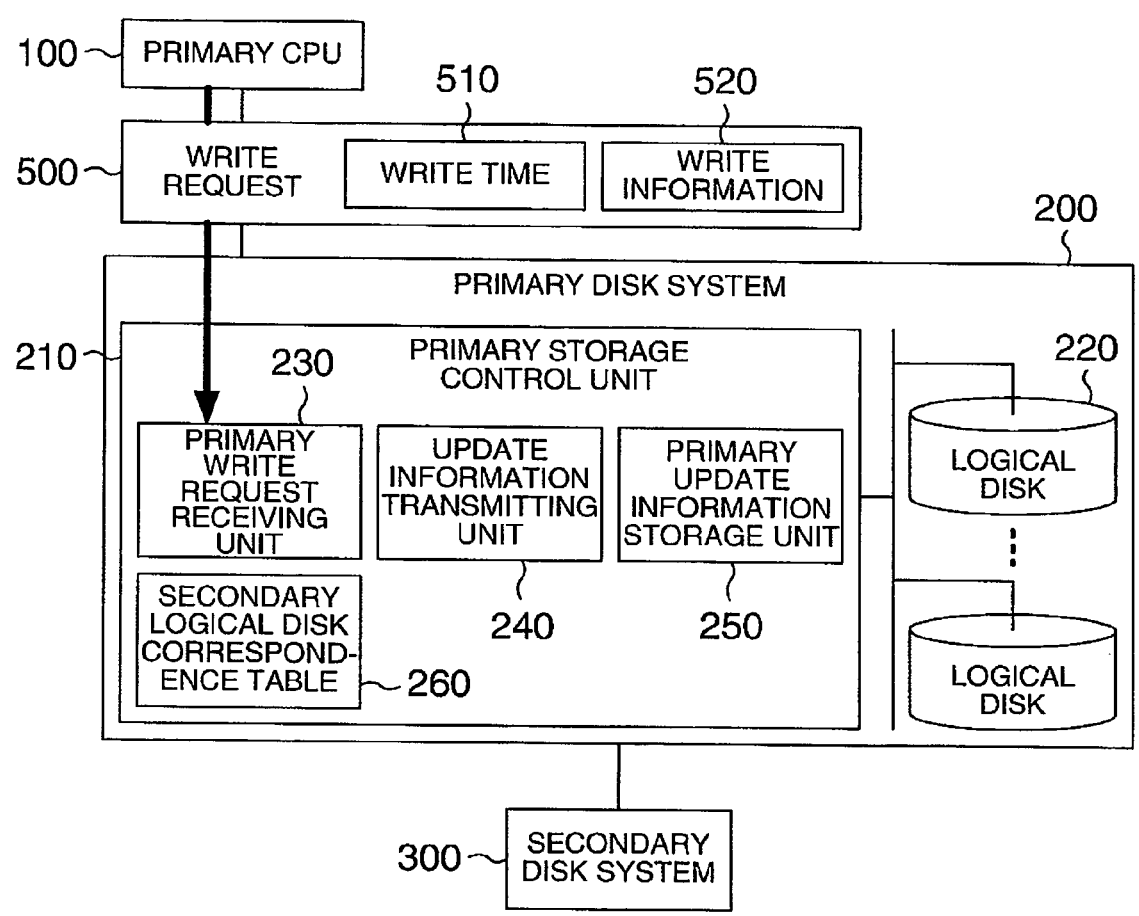
FIG. 2 is a diagram showing an example of the structure of a primary disk system.

FIG. 2 is a diagram showing an example of the structure of the primary disk system 200 according to the first embodiment.

The primary disk system 200 has a primary disk control unit 210 and a logical disk 220.

A logical disk 220 is a disk designated by software to be executed by the primary CPU 100. In the present invention, the logical disk 220 may be mounted as an actual physical disk or as a plurality of physical disks of a RAID (Redundant Array of Inexpensive Disks). Mounting such a logical disk 220 can be performed by a general disk system mounting method, and the detailed description will not given in this specification.

The primary disk control unit 210 has a primary write request receiving unit 230, an update information transmitting unit 240, a primary update information storing unit 250 and a secondary logical disk correspondence table 260. In the following, a process to be executed at each unit may be a process executed by CPU in the primary disk control unit 210 in accordance with a program corresponding to each unit and stored in a memory of the primary disk control unit 210.

A secondary logical disk correspondence table 260 is used for obtaining a logical disk ID of the secondary disk system 300 from a primary logical disk ID of a corresponding primary disk system 200 contained in write information, to be described later.

A write request 500 is issued from the primary CPU 100 to the primary disk system 200 and contains a write time 510 and write information 520. In this invention, the write time 510 is added to the write information 520 when the primary CPU 100 issues the write request 500 to the primary disk system 200. The write time 510 indicates the time when the write request 500 is issued. By referring to the write time 510, the primary disk system 200 can arrange the order of a plurality of write requests 500. If there are a plurality of primary CPUs 100, it is assumed that the order of write requests 500 issued from different primary CPUs 100 can be arranged, for example, by adding a write time to a write request by using a common clock. The write information 520 contains write data itself, a write logical disk ID, a write data length and a write address. This information is general write information issued from the primary CPU 100 to the primary disk system 200, and so the details thereof are not described in this specification.

Figure 3:
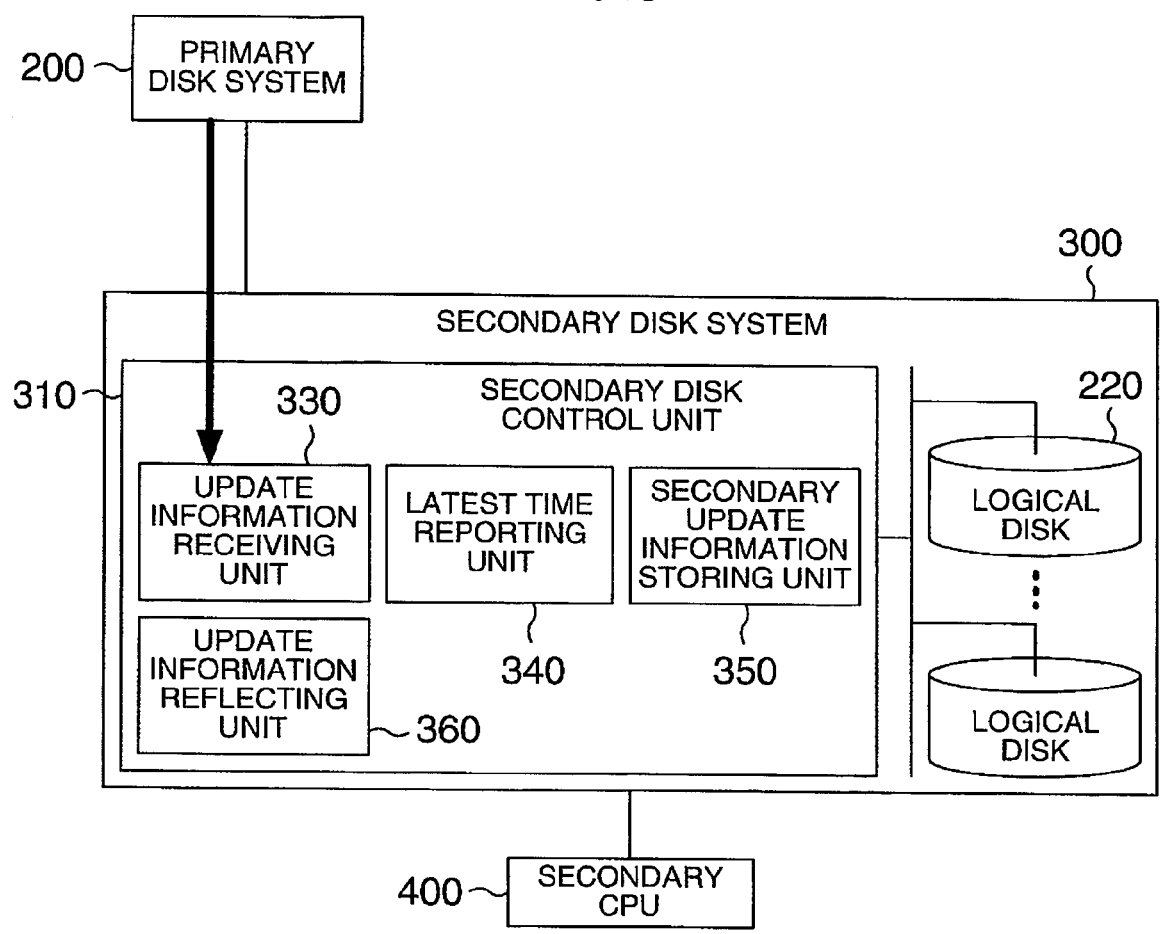
FIG. 3 is a diagram showing an example of the structure of a secondary disk system.

FIG. 3 is a diagram showing an example of the secondary disk system 300 according to the first embodiment. In the following, a process to be executed at each unit may be a process executed by CPU in the secondary disk control unit 310 in accordance with a program corresponding to each unit and stored in a memory of the secondary disk control unit 310.

A logical disk 220 is designated by software executed by the secondary CPU 400. The details of mounting the logical disk are not described in this specification because the mounting method is a general disk system mounting method similar to the logical disk 220 of the primary disk system 200.

Figure 4:
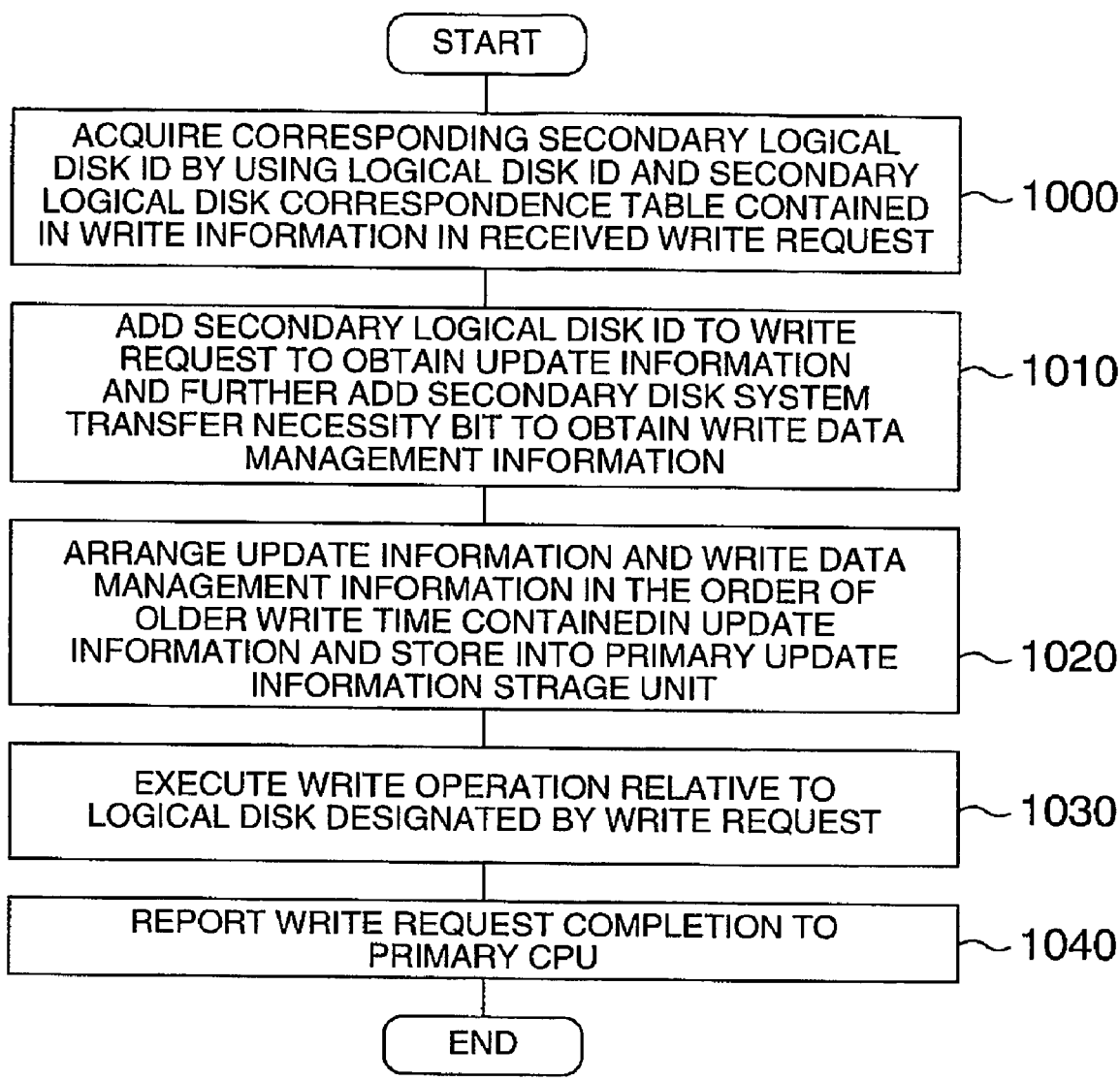
FIG. 4 is a diagram showing an example of a process at a primary write request receiving unit.

FIG. 4 is a diagram showing an example of a process at the primary write request receiving unit 230 according to the first embodiment. The primary write receiving unit 230 executes the process shown in FIG. 4 each time the primary CPU 100 issues the write request 500.

At Step 1000, upon reception of the write request 500, the primary write request receiving unit 230 acquires the secondary logical disk ID corresponding to the primary logical disk 220 designated by the write information 520, by using the logical disk ID and the secondary logical disk correspondence table 260 contained in the write information 510 in the received write request 500. Next, at Step 1010 the primary write request receiving unit 230 adds the acquired secondary logical disk ID to the write request 500 to generate update information. The update information is the information of the write request 500 received at the primary disk system 200 and added with the acquired secondary logical disk ID. The primary write request receiving unit 230 generates write data management information which is the update information added with a secondary disk system transfer necessity bit. The secondary disk system transfer necessity bit is information representative of that which is necessary to transfer update information to the secondary disk system 300. Next, at Step 1020 the primary write request receiving unit 230 arranges the update information and write data management information generated by the primary disk write request receiving unit 230 in the order of older write time 510 contained in the update information, and stores it in the primary update information storing unit 250. When the write data management information is stored in the primary update information storage unit 250, the secondary disk system transfer necessity bit is turned ON. The primary update information storing unit 250 is a storage system for storing the update information in the order of older write time 510 contained in the update information. Next, at Step 1030 the primary write request receiving unit 230 executes a write operation of write data relative to the logical disk 220 designated by the write request 500, to thereby write the write data in a logical disk indicated by the logical disk ID in the write request. Lastly, at Step 1040 the primary write request receiving unit notifies a completion of the write request 500 to the primary CPU 100. In this manner, the update information is stored in the primary update information storing unit 250 in the order of issuing the write request 500. In this embodiment, although the write data management information is stored in the primary update information storage unit 250, the invention is not limited to this embodiment.

Figure 5:
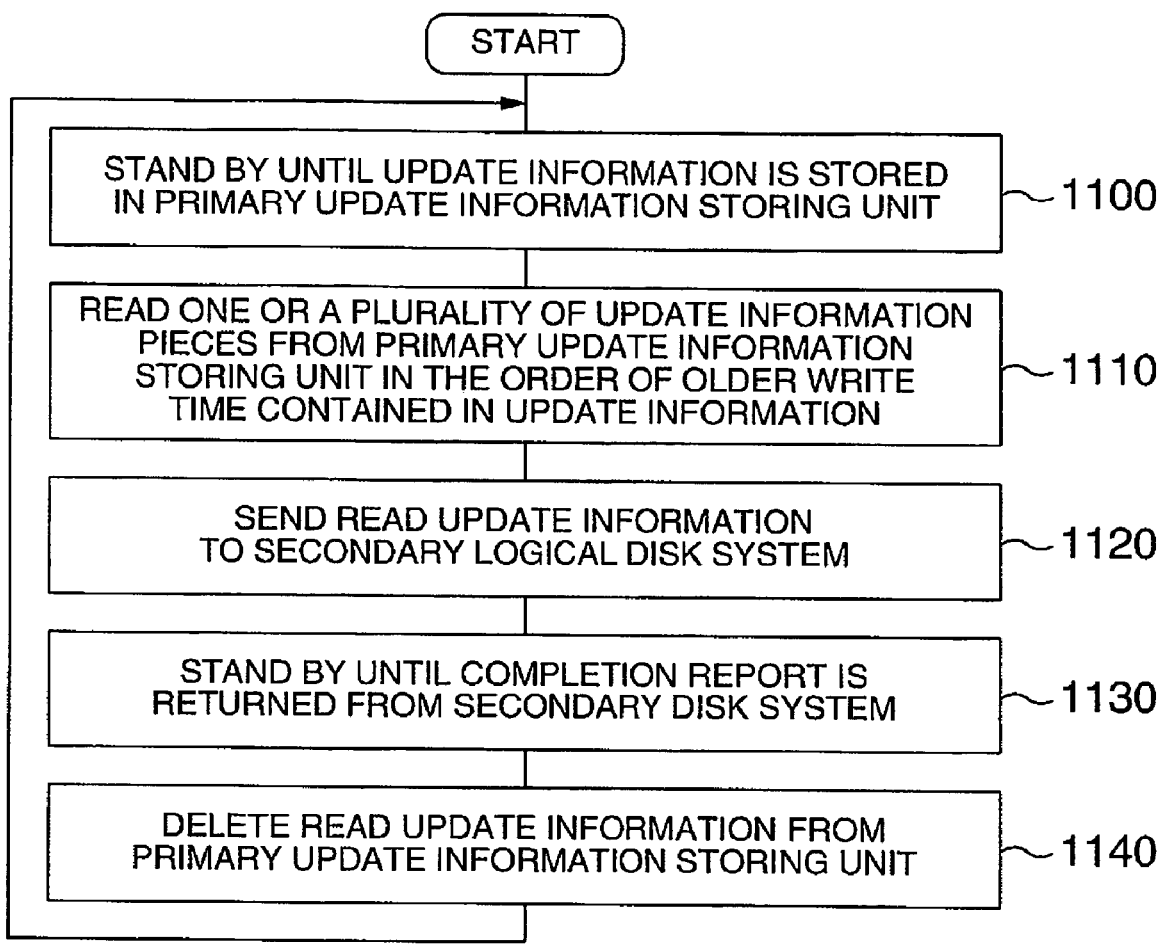
FIG. 5 is a diagram showing an example of a process at an update information transmitting unit.

FIG. 5 is a diagram showing an example of a process at the update information transmitting unit 240 according to the first embodiment. The update information transmitting unit 240 executes the process shown in FIG. 5 while the primary disk system 200 has the logical disk 220 designated as a remote copy primary disk.

At Step 1100 the update information transmitting unit 240 stands by until the update information is stored in the primary update information storing unit 250. Next, at Step 1110 the update information transmitting unit 240 reads update information from the primary update information storing unit 250 in the order of older write time 510 contained in the update information. Next, at Step 1120 the update information transmitting unit 240 sends the read update information to the secondary disk system 300 connected to the primary disk system 200. Next, at Step 1130 the update information transmitting unit 240 stands by until a completion report is returned from the secondary disk system 300. Upon reception of the completion report from the secondary disk system 300, the update information transmitting unit 240 turns OFF the secondary disk system transfer necessity bit in the write data management information. Lastly, at Step 1140 the update information transmitting unit 240 deletes the read update information from the primary update information storing unit 250 to thereafter return to Step 1100. In this manner, the update information stored in the primary update information storing system 250 is sent to the connected secondary disk system 300 in the order of older write time 510 contained in the update information (i.e., in the order of issuing the write request 500).

Figure 6:
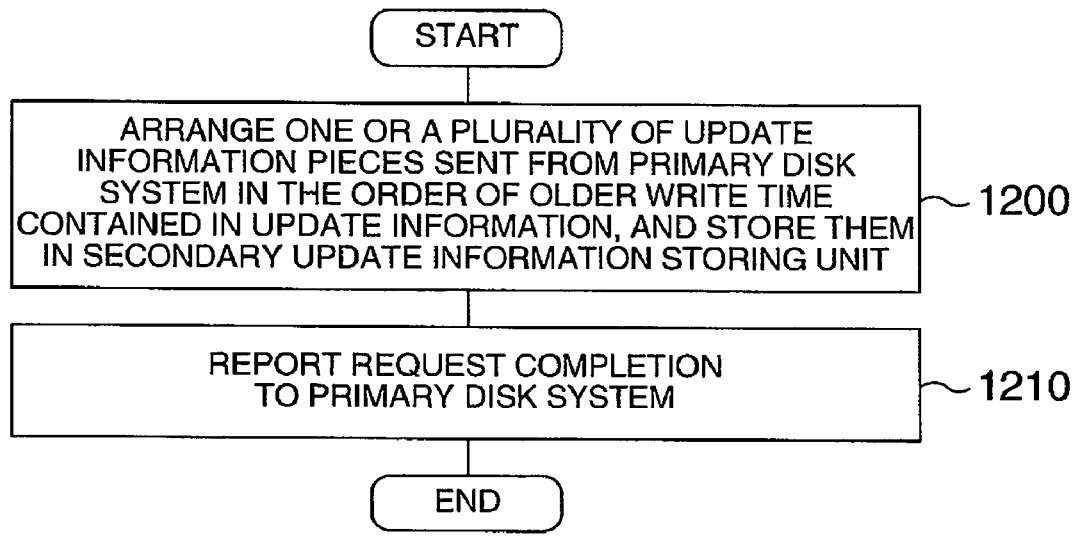
FIG. 6 is a diagram showing an example of a process at an update information receiving unit.

FIG. 6 is a diagram showing an example of a process at the update information receiving unit 330 according to the first embodiment. The update information receiving unit 330 executes the process shown in FIG. 6 each time the update information is received from the connected primary disk system 200.

At Step 1200, upon reception of update information from the primary disk system 200, the update information receiving unit 330 arranges one or a plurality of update information pieces sent from the primary disk system 200 in the order of older write time 510 contained in the update information, and stores them in the secondary update information storing unit 350. Next, at Step 1210 the update information receiving unit 330 sends a completion report to the primary disk system 200. In this manner, the update information is stored in the secondary update information storing unit 350 in the order of older write time 510 contained in the update information (i.e., in the order of issuing the write request 500).

Figure 7:
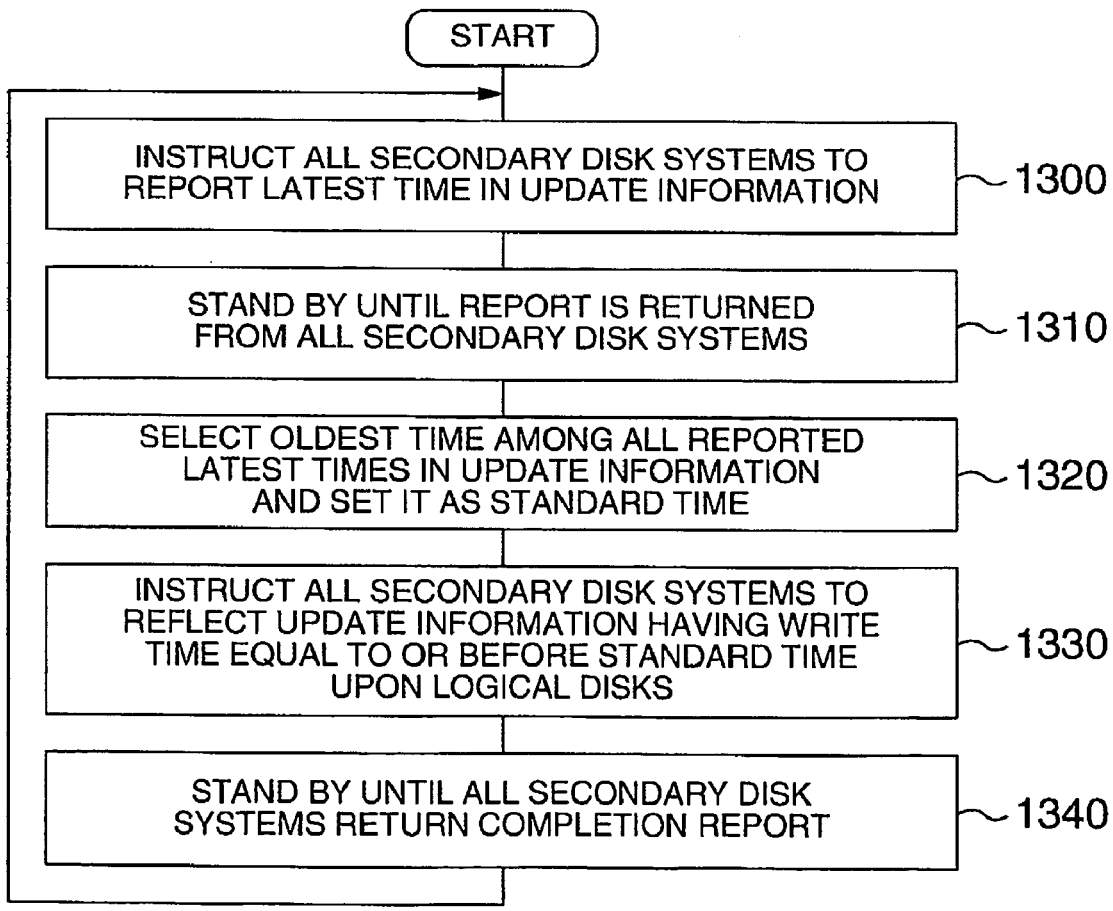
FIG. 7 is a diagram showing an example of a process by an update information reflecting instruction program.

FIG. 7 is a diagram showing an example of a process by the update information reflecting instruction program 410 according to the first embodiment. The update information reflecting instruction program 410 executes the program shown in FIG. 7 while the secondary disk system 300 has the logical disk 220 designated as a remote copy secondary disk.

At Step 1300 the update information reflecting instruction program 410 instructs the latest time reporting unit 340 in all secondary disk systems 300 connected to the secondary CPU 400 to report the latest time among the write times 510 contained in the update information held by each secondary disk system 300. In response to the instruction from the update information reflecting instruction program 410, the latest time reporting unit 340 returns the latest time among the write times 510 in the update information stored in the secondary update information storing unit 350, to the update information reflecting instruction program 410. Next, at Step 1310 the update information reflecting instruction program 410 stands by until the latest time is reported from all the secondary disk systems 300. Next, at Step 1320 the update information reflecting instruction program 410 selects the oldest time among all the times reported from each secondary disk system 300, and sets it as a standard time. Next, at Step 1330 the update information reflecting instruction program 410 instructs the update information reflecting unit 360 of each of the secondary disk systems 300 to write the write data in the update information having the write time 510 equal to or before the standard time in the logical disk 220 of the secondary disk system 300 indicated by ID in the update information. Upon reception of the instruction from the update information reflecting instruction program 410, the update information reflecting unit 360 writes only the write data in the update information having the write time 510 equal to or before the standard time in the logical disk 220 indicated by the primary logical disk ID contained in the update information, and deletes the update information written with the write data in the update information, from the secondary update information storing unit 350. Next, at Step 1340 the update information reflecting instruction program 410 stands by until a completion report for the write instruction of the write data issued at Step 1330 is returned from all secondary disk systems 300, to thereafter return to Step 1300. In this manner, the following state can be established: the write data having the write time 510 equal to or before the standard time is written, whereas the write data having the write time 510 after the standard time is not written, relative to a plurality of logical disks 220 in a plurality of secondary disk systems 300.

As described above, the transmission order of the update information from the primary disk system 200 to the secondary disk system 300 and the reception order at the secondary disk system 300 is in the order of write time. Therefore, the secondary disk system stores all the update information equal to or before the standard time and does not store at all the update information after the standard time. It is therefore possible for the secondary disk system 300 to execute the recovery process and avoid leaving the intermediate results of transactions, even if the primary disk system 200 is inoperative for any reason (or destroyed).

In the embodiment described above, the primary disk system 200 transmits sequentially the update information in the order of older update information to the secondary disk system 300. Upon reception of the update information from the primary disk system 200, the secondary disk system 300 transmits a reception notice of the update information to the primary disk system 200. After the reception notice of the update information from the secondary disk system 300, the primary disk system 200 transmits the next update information (hereinafter such update information transfer is called a serialized transfer). Therefore, the order of update information does not become irregular when the update information is transferred from the primary disk system 200 to the secondary disk system 300. However, as the primary disk system serially transfers the update information to the secondary disk system 300, there occurs a time lapse before the next update information is transmitted to the secondary disk system 300, resulting in a poor performance of update information transfer. In order to avoid this, as will be described below, the operation of the transfer of update information from the primary disk system 200 to secondary disk system 300 is performed in parallel. In the following discussion, only differences from that of serial transmission of the update information will be described.

A primary standard time transmitting unit is added to the primary disk control unit 210, and a secondary standard time receiving unit and a primary failure data discarding unit are added to the secondary disk control unit 310.

With reference to FIG. 5, description will be made on the operation of the update information transmitting unit 240 wherein update information is transferred in parallel from the primary disk system 200 to secondary disk system 300.

At Step 1110, the update information transmitting unit 240 reads a plurality of update information pieces from the update information storage unit 250 in the order of older write time in the update information. Next, at Step 1120 the update information transmitting unit 240 transmits in parallel the plurality of read update information pieces to the secondary disk systems 300 connected to the primary disk systems 200. At Step 1130, the update information transmitting unit 240 stands by until the completion report for each update information piece is sent from the secondary disk system 300. When the completion report is returned, the secondary disk system transfer necessity bit in the write data management information corresponding to the completion report is turned OFF. When the completion reports for all the plurality of update information pieces transmitted in parallel are received and the corresponding secondary disk system transfer necessity bits become OFF, the operation returns to Step 1100 to find the update information to be next transmitted.

As the update information is transmitted in parallel, the update information is not always received at the secondary disk system 300 in the order of write time. Although the primary disk system 200 transmits the update information to the secondary disk system 300, the update information may not reach the secondary disk system by some reason. In this case, the write data permitted to be subjected to de-stage is write data equal to or before a de-stage permission time. The de-stage permission time is the oldest write time 111 in the write data management information having the ON secondary disk system transfer necessity bits possessed by the primary disk control units 210. This is because all the update information having a write time equal to or before the de-stage permission time is stored on the side of the secondary disk systems 300. On the other hand, the write data in the update information having the write time after the de-stage permission time is not permitted to be de-staged as yet, and it is necessary not to de-stage the write data and to discard it when the primary disk system 200 is inoperative (or destroyed).

The primary standard time transmitting unit has a function of transmitting the de-stage permission time to the secondary disk system 300. As described above, the de-stage permission time is the oldest write time among the write data management information having the ON secondary disk system transfer necessity bits.

The secondary standard time receiving unit stores the standard time received from the primary disk system 200 in the secondary update information storage unit 350 as the de-stage permission time.

Upon reception of an instruction from the update information reflecting instruction program 410, the latest time reporting unit 340 returns the latest time among the de-stage permission times stored in the secondary update information storage unit 350, to the update information reflecting instruction program 410.

When the primary disk system 200 is destructed, the primary failure data discarding unit discards the update information having the write time after the de-stage permission time and possessed by the secondary update information storage unit 350.

Second Embodiment

Next, the second embodiment will be described.

In the first embodiment, as the standard time which is supplied by the update information reflecting instruction program 410 to the secondary disk system 300, the time stored in the secondary update information storing unit 350, i.e., the past time, is used. In this case, the update information reflecting instruction program 410 first collects the latest times of update information from all secondary disk systems 300 and sets the oldest time among them as the standard time. Two instructions are therefore required to be supplied to each secondary disk system 300 in order to designate one standard time. In the second embodiment, a future time is used as the standard time so that one instruction is made for each secondary disk system 300. In the second embodiment, only different points from the first embodiment will be described. The constituent elements and flow charts other than the description of the second embodiment are the same as those of the first embodiment.

The different point of the configuration of a secondary CPU of the second embodiment from the configuration of the secondary CPU of the first embodiment system resides in that the update information reflecting instruction program 410 in MS 120 of the secondary CPU is changed to an update information reflecting information program a 411. The constituent elements other than this are similar to those of the first embodiment.

The differences of the configuration of the secondary disk system 300 of the second embodiment from the configuration of the secondary disk system 300 of the first embodiment reside in that the update information reflecting unit 360 in the secondary disk control unit 310 is changed to an update information reflecting unit a 361 and the second embodiment does not have the latest time reporting unit 340.

The constituent elements other than these are similar to those of the first embodiment.

Figures 8, 9:
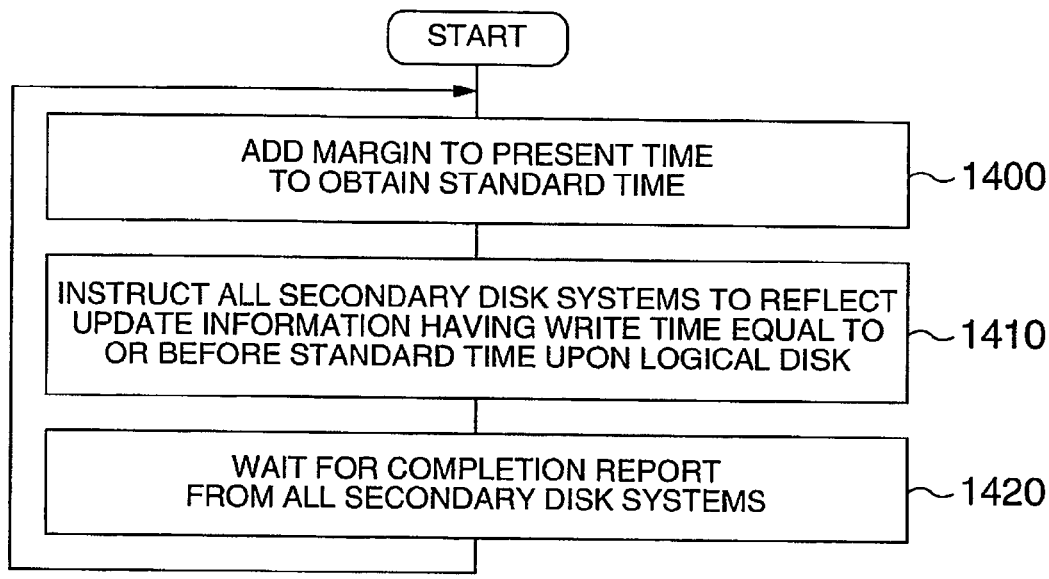

FIG. 8 is a diagram showing an example of a process by the update information reflecting instruction program a 411 according to the second embodiment. The update information reflecting instruction program a 411 executes the program shown in FIG. 8 while the secondary disk system 300 has the logical disk 220 designated as a remote copy secondary disk.

At Step 1400 the update information reflecting instruction program a 411 adds a margin to the present time of a timer in the secondary CPU 400 to obtain the standard time.

FIG. 9 shows an example of a calculation equation for a maximum margin. First, α shown in FIG. 9 is calculated. α is an addition of a maximum time taken for the update information reflecting instruction program a to inform the standard time to the update information reflecting units a in all the secondary disk systems 300 and a time difference between a timer of the primary CPU and a timer of the secondary CPU. The minimum margin is α multiplied by a safety factor (>1). It is assumed that these values are determined in advance. It is also assumed that the margin has a value equal to or larger than the value calculated by the calculation equation shown in FIG. 9. Next, at Step 1410 the update information reflecting instruction program a 411 instructs the update information reflecting unit a 361 in each of the secondary disk systems 300 to write the write data in the update information having the write time 510 equal to or before the calculated standard time, in the logical disk 220 in the secondary disk system 300 indicated by ID in the update information. Upon reception of the instruction from the update information reflecting instruction program a 411, the update information reflecting unit a 361 writes only the write data in the update information having the write time 510 equal to or before the instructed standard time, among the update information in the secondary update information storing unit 350, in the logical disk 220 designated by the secondary logical disk ID contained in the update information, and deletes the written update information from the secondary update information storing unit 350. At the time when the instruction is received from the update information reflecting program a 411, the standard time is a future time. Therefore, during some initial period, the update information reflecting unit a 361 writes the write data in all the update information in the secondary update information storing unit 350 in the logical disk 220. However, after the initial period, update information having the write time past the standard time is stored in the secondary update information storing unit 350. When the update information reflecting unit a 361 finds the update information having the write time past the standard time, it reports a completion to the update information reflecting program a 411. Next, at Step 1420 the update information reflecting program a 411 stands by until a completion report for the write instruction is returned from all secondary disk systems 300, to thereafter return to Step 1400. In this manner, the following state can be established: the write data in the update information having the write time 510 equal to or before the standard time is written in a plurality of logical disks 220 in a plurality of secondary disk systems 300, whereas the write data in the update information having the write time 510 after the standard time is not written.

As described above, the transmission order of the update information from the primary disk system 200 to the secondary disk system 300 and the reception order at the secondary disk system 300 is in the order of write time. Therefore, the secondary disk system 300 stores all the update information equal to or before the standard time and does not store at all the update information after the standard time. It is therefore possible for the secondary disk system 300 to execute the recovery process while avoiding results of intermediate transactions, even if the primary disk system 200 is inoperative (or destroyed).

In the embodiment described previously, the primary disk system 200 transmits serially the update information in the order of older update information to the secondary disk system 300. Therefore, the order of update information does not become irregular when the update information is transferred from the primary disk system 200 to the secondary disk system 300. However, as the primary disk system serially transfers the update information to the secondary disk system 300, there occurs a time lapse before the next update information is transmitted to the secondary disk system 300, resulting in a poor performance of update information transfer.

In order to avoid this, as will be described below, the operation of the transfer of update information from the primary disk system 200 to secondary disk system 300 is performed in parallel. In the following discussion, only differences from that of serial transmission of the update information will be described.

A primary standard time transmitting unit is added to the primary disk control unit 210, and a secondary standard time receiving unit and a primary failure data discarding unit are added to the secondary disk control unit 310.

As the update information is transmitted in parallel, the update information is not always received at the secondary disk system 300 in the order of write time. Although the primary disk system 200 transmits the update information to the secondary disk system 300, the update information may not reach the secondary disk system 300 by some reason. In this case, the write data permitted to be subjected to de-stage is write data equal to or before a de-stage permission time. The de-stage permission time is the oldest write time 111 in the write data management information having the ON secondary disk system transfer necessity bits possessed by the primary disk control units 210. This is because all the update information having a write time equal to or before the de-stage permission time is stored on the side of the secondary disk systems 300. On the other hand, the write data in the update information having the write time after the de-stage permission time is not permitted to be de-staged as yet, and it is necessary not to de-stage the write data and to discard it when the primary disk system 200 is inoperative (or destroyed).

The primary standard time transmitting unit has a function of transmitting the de-stage permission time to the secondary disk system 300. As described above, the de-stage permission time is the oldest write time among the write data management information having the ON secondary disk system transfer necessity bits.

The secondary standard time receiving unit stores the standard time received from the primary disk system 200 in the secondary update information storage unit 350 as the de-stage permission time.

Description will be made on the operation by the update information reflecting unit 350 when update information is transferred in parallel from the primary disk system 200 to the secondary disk system 300.

Upon reception of an instruction from the update information reflecting instruction program, the update information reflecting unit writes only the write data in the update information having a write time 510 equal to or before the instructed standard time, among the update information contained in the secondary update storage unit, in the logical disk 220 indicated by the secondary logical disk ID contained in the update information. However, the write data in the update information having the write time after the de-stage permission time is not written in the logical disk 220. The write data not to be written, although it has the write time equal to or before the standard time, is written when the write time in the update information becomes equal to or is before the de-stage permission time. Next, the update information whose write data has been written is deleted from the secondary update information storage unit 350. At the time when the instruction is received from the update information reflecting program a 411, the standard time is a future time. Therefore, during some initial period, the update information reflecting unit a 361 writes the write data in all the update information in the secondary update information storing unit 350 in the logical disk 220. However, after the initial period, update information having the write time past the standard time is stored in the secondary update information storing unit 350. When the update information reflecting unit a 361 finds the update information having the write time past the standard time, it compares the standard time with the de-stage permission time. If the standard time is equal to or is before the de-stage permission time, the update information reflecting unit a 361 reports a completion to the update information reflecting program a 411. If the standard time is past the de-stage permission time, the update information reflecting unit a 361 does not report the completion to the update information reflecting program a 411 until the standard time becomes equal to or is before the de-stage permission time. In this manner, the following state can be established: the write data in the update information having the write time 510 equal to or before the standard time is written in a plurality of logical disks 220 in a plurality of secondary disk systems 300, whereas the write data in the update information having the write time 510 after the standard time is not written.

With this configuration, it is possible to set only one instruction to each secondary disk system 300.

Third Embodiment

Next, the third embodiment will be described.

In the first embodiment, if the update information is stored in the primary update information storage unit 250 in the primary disk system 200, the update information transmitting unit 230 of the primary disk system transmits the update information to the secondary disk system 300. Namely, the primary disk system 200 has the initiative in transferring the update information. The third embodiment discloses the arrangement that the secondary disk control unit 310 has the initiative in transferring the update information. In the third embodiment, only differences with that of the first embodiment will be described. The constituent elements and flow charts other than the description of the third embodiment are the same as those of the first embodiment.

The difference of the configuration of the primary disk system 200 of the third embodiment from the configuration of the primary disk system 200 of the first embodiment resides in that the update information transmitting unit 240 is changed to an update information transmitting unit a 241. The constituent elements other than this are similar to those of the first embodiment.

The difference of the configuration of the secondary disk system 300 of the third embodiment from the configuration of the secondary disk system 300 of the first embodiment resides in that the update information receiving unit 330 in the secondary disk control unit 310 is changed to an update information receiving unit a 331. The constituent elements other than this are similar to those of the first embodiment.

Figure 10:
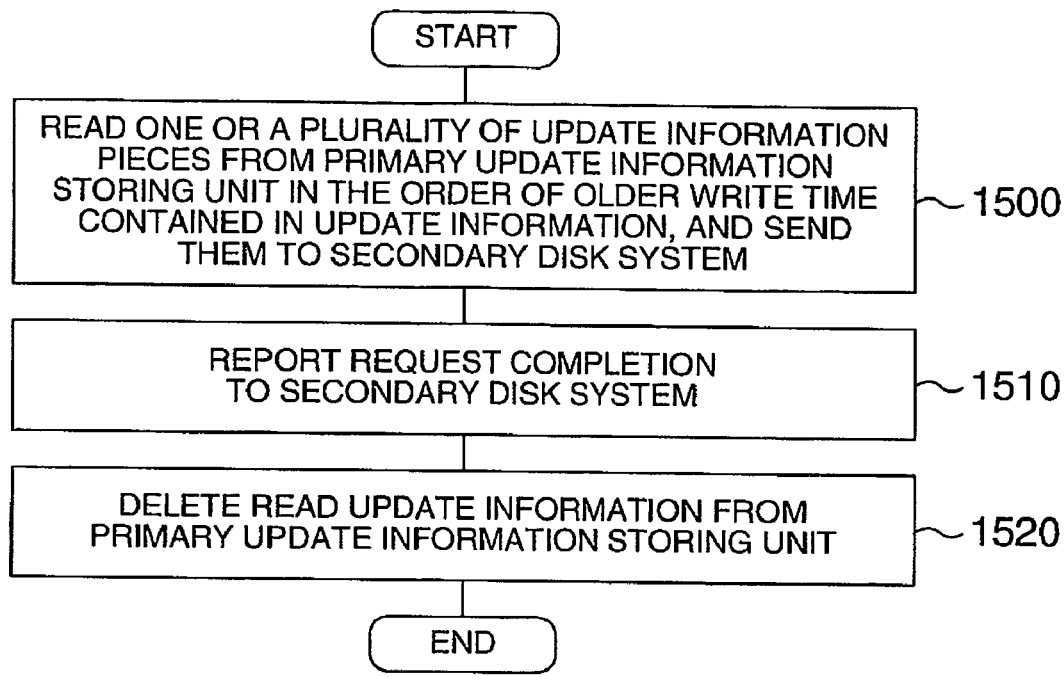
FIG. 10 is a diagram showing an example of a process by an update information transmitting unit.

FIG. 10 is a diagram showing an example of a process at the update information transmitting unit a 241 according to the third embodiment. The update information transmitting unit a 241 executes the process shown in FIG. 10 each time an update information read request is received from the connected secondary disk system 300.

At Step 1500, upon reception of an update information read request transmitted from the secondary disk system 300, the update information transmitting unit a 241 reads one or a plurality of update information pieces from the primary update information storing unit 250 in the order of older write time 510 contained in the update information, and sends them to the secondary disk system 300. Next, at Step 1510 the update information transmitting unit a 241 sends a completion report to the secondary disk system 300. Next, at Step 1520 the update information transmitting unit a 241 deletes the read update information from the primary update information storing unit 250. In this manner, the update information stored in the primary update information storing system 250 is sent to the secondary disk system 300 in the order of older write time 510 contained in the update information (i.e., in the order of issuing the write request 500).

Figure 11:
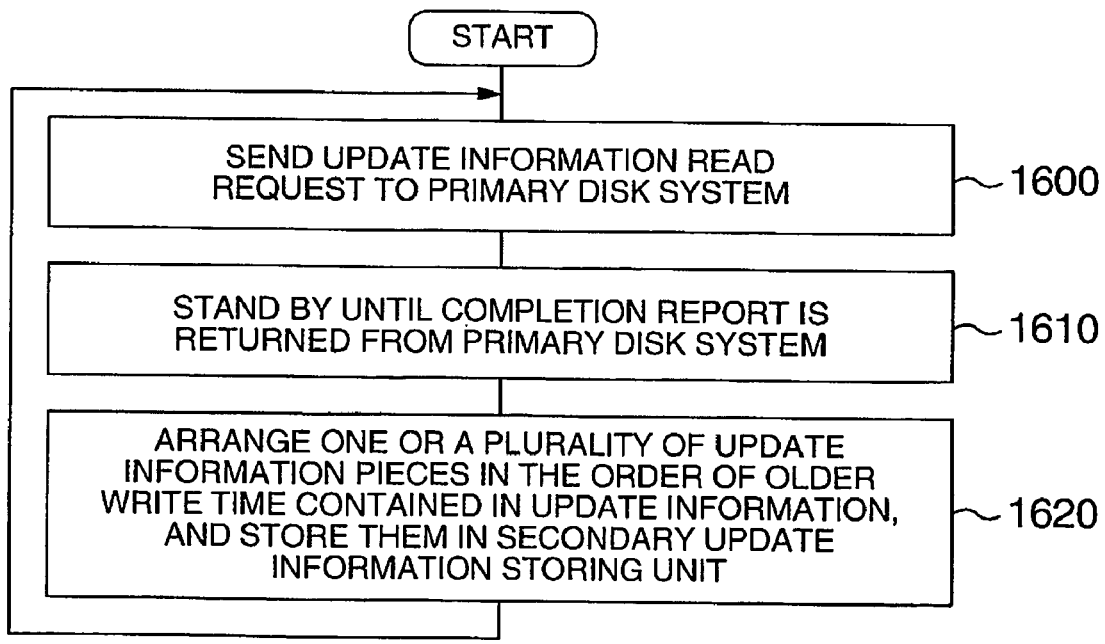
FIG. 11 is a diagram showing an example of a process by an update information receiving unit.

FIG. 11 is a diagram showing an example of a process at the update information receiving unit a 331 according to the third embodiment. The update information receiving unit a 331 executes the process shown in FIG. 15 while the secondary disk system 300 has the logical disk 220 designated as a remote copy secondary disk.

At Step 1600, the update information receiving unit a 331 sends an update information read request to the primary disk system 200. Next, at Step 1610 the update information receiving unit a 331 stands by until a completion report is returned from the primary disk system 200. Next, at Step 1620 the update information receiving unit a 331 arranges one or a plurality of update information pieces sent from the primary disk system 100 in the order of older write time contained in the update information, and stores them in the secondary update information storing unit 350 to thereafter return to Step 1600. In this manner, the update information is stored in the secondary update information storing unit 350 in the order of older write time 510 contained in the update information (i.e., in the order of issuing the write request 500).

With this arrangement, the secondary disk system 300 can have the initiative in transferring the update information.

The third embodiment may be applied to the second embodiment.

Fourth Embodiment

Next, the fourth embodiment will be described. In the first embodiment, the standard time (i.e., the time when the write data in update information having the write time 510 equal to or before the standard time is written in the logical disk 220 in the secondary disk system 300 indicated by an ID in the update information) which is notified by the update information reflecting instruction program 410 to the update information reflecting unit 360, is the oldest time among all times reported from all secondary disk systems 300. Consider now, for example, the case wherein data from the primary CPU 100 is not written in one primary disk system but data from the primary CPU 100 is sequentially written in another primary disk system 200. In this case, if the standard time is determined in the manner described above, and after a lapse of a predetermined time from the standard time if the update information reflecting instruction program 410 instructs again all the secondary disk systems 300 to report the latest time (hereinafter called a newest time) among write times 510 obtained in the update information possessed by the secondary disk systems 300, the secondary system 300 corresponding to the primary disk system 200 in which data from the primary CPU 100 is not written for a long time, reports the same time as that reported to the update information reflecting instruction program 410 at the previous time. Therefore, the standard time is not updated. Although a large amount of update information was transmitted to the other secondary disk system 300 from the primary disk system 200, the de-stage will not occur for a long time. As a result, a data difference increases between the primary and secondary disk systems.

The fourth embodiment shows a method of reducing a data difference between the primary and secondary disk systems. In the fourth embodiment, only differences from that of the first embodiment will be described. The contents other than those described in the fourth embodiment are all equivalent to the first embodiment.

The difference between the secondary disk system 300 of the fourth embodiment and the secondary disk system 300 of the first embodiment resides in that the secondary disk control unit 310 has a time storage unit. Other structures are equivalent to the first embodiment.

The update information reflecting instruction program 410 determines a subsidiary standard time at the same time when it determines the standard time. The update information reflecting instruction program 410 selects the latest time from all times reported from all the secondary disk systems 300 and used when the standard time is determined, and uses it as the subsidiary standard time.

When the standard time is transmitted to the update information reflecting unit 360, the update information reflecting instruction program 410 transmits the standard time and subsidiary standard time to the time storage unit 380 which stores them. The latest time reporting unit 340 reports the newest time also to the time storage unit 380 when it reports the latest time among write times 510 possessed by the update information contained in the secondary update information storage unit 350, to the update information reflecting instruction program 410. The time storage unit 380 receiving the report of the newest time stores the newest time. If the standard time, subsidiary standard time and newest time have already been stored, they are updated each time new standard time, subsidiary time and newest time are received.

The update information reflecting instruction program 410 instructs the latest time reporting unit 340 of each of the secondary disk systems 300 connected to the secondary CPU to report the latest time among write times contained in the update information possessed by each secondary disk system.

Figure 12:
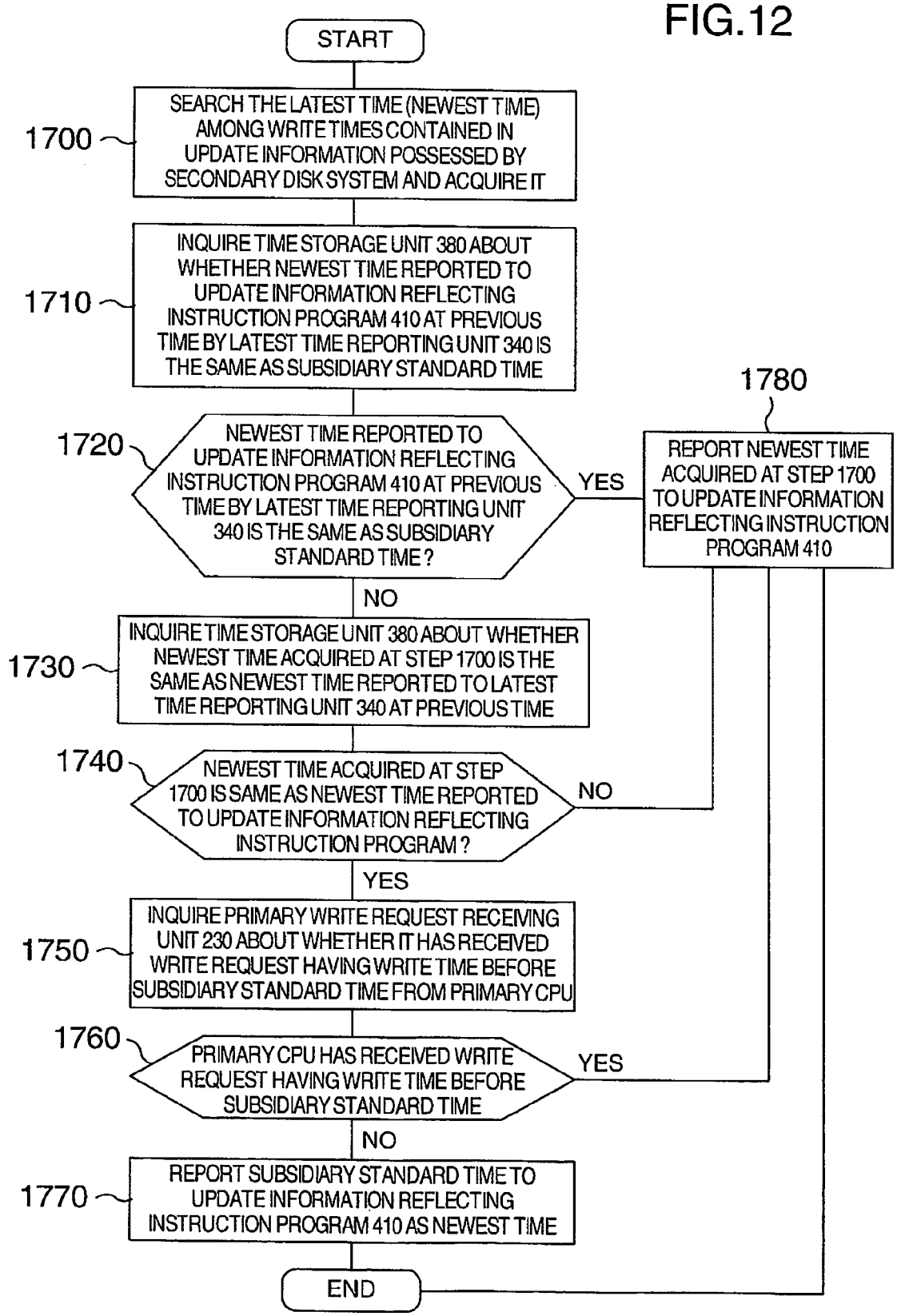
FIG. 12 is a diagram showing an example of a process by a latest time reporting unit.

FIG. 12 is a diagram showing an example of the processes to be executed by the latest time reporting unit 340 of the fourth embodiment. The latest time reporting unit 340 executes the processes shown in FIG. 12 each time it is instructed by the update information reflecting instruction program 410 to report the latest time among write times contained in the update information.

Upon the instruction from the update information reflecting instruction program 410, the latest time reporting unit 340 searches the latest time among write times 510 pos-sessed by the update information contained in the secondary update information storage unit 350, and acquires it (Step 1700).

The latest time reporting unit 340 inquires the time storage unit 380 about whether the newest time reported to the update information reflecting instruction program 410 at the previous time is the same as the subsidiary standard time (Step 1710). The time storage unit 380 receiving the inquiry from the latest time reporting unit 340 judges whether the stored newest time is the same as the subsidiary standard time, and reports the judgement to the latest time reporting unit 340. The latest time reporting unit 340 receives from the time storage unit 380 the result of the judgement as to whether the newest time is the same as the subsidiary standard time (Step 1720).

If the newest time reported to the update information reflecting instruction program 410 at the previous time is the same as the subsidiary standard time, the latest time reporting unit 340 received the report from the time storage unit 380 and reports the newest time acquired at Step 1700 to the update information reflecting instruction program 410 (Step 1780).

If the newest time reported to the update information reflecting instruction program 410 at the previous time is not the same as the subsidiary standard time, the latest time reporting unit 340 inquires of the time storage unit 380 about whether the newest time acquired at Step 1700 is the same as the newest time reported to the update information reflecting instruction program 410 at the previous time (Step 1730). At this time, the latest time reporting unit 340 transmits the newest time acquired at Step 1700 to the time storage unit 380. The latest time stored in the time storage unit 380 is not updated even if the newest time acquired at Step 1700 is transmitted to the time storage unit 380. The latest time reporting unit 340 temporarily stores the newest time acquired at Step 1700 and transmitted from the latest time recording unit 340. Upon reception of the inquiry from the latest time reporting unit 340, the time storage unit 380 judges whether the newest time (newest time transmitted to the update information reflecting instruction program 410 at the previous time) stored in the time storage unit 380 is the same as the newest time transmitted from the latest time reporting unit 340 at Step 1730, and reports a judgement result to the latest time reporting unit 340.

The latest time reporting unit 340 receives from the time storage unit 380 the judgement result of whether the newest time stored in the time storage unit 380 is the same as the newest time transmitted from the latest time reporting unit 340 (Step 1740).

If the newest time acquired at Step 1700 is not the same as the newest time acquired at the previous time, the newest time acquired at Step 1700 is reported to the update information reflecting instruction program 410 (Step 1780).

If the newest time acquired at Step 1700 is the same as the newest time acquired at the previous time, the latest time reporting unit 340 issues to the primary write request receiving unit 230 an inquiry about whether it has received the write request 500 before the subsidiary standard time from the primary CPU (Step 1750).

The primary write request receiving unit 230 receiving the inquiry from the latest time reporting unit 340 refers to the primary update information storage unit 250 to confirm whether it stores the update information before the subsidiary standard time among the update information having the secondary disk system transfer necessity bit of ON, and transmits a confirmation result to the latest time reporting unit 340.

The latest time reporting unit 340 receives from the primary write request receiving unit 230 an inquiry result about whether it has received the write request 500 before the subsidiary standard time from the primary CPU (Step 1760).

If the latest time reporting unit 340 receives from the primary write request receiving unit 230 a notice to the effect that the write request 500 before the subsidiary standard time has been received, the latest time reporting unit 340 reports the newest time acquired at Step 1700 to the update information reflecting instruction program 410 (Step 1780).

If the latest time reporting unit 340 receives from the primary write request receiving unit 230 a notice to the effect that the write request 500 before the subsidiary standard time has not been received, the latest time reporting unit 340 reports the subsidiary standard time to the update information reflecting instruction program 410 as the newest time (Step 1770).

As described above, even if the update information does not exist for a predetermined time, the newest time returned to the update information reflecting instruction program 410 is updated so that a data difference between the primary and secondary disk systems can be reduced.

In the contents described above, update information is serially transferred. If update information is to be transferred in parallel from the primary disk system 200 to secondary disk system 300, the de-stage permission time stored in the secondary update information storage unit 350 is used to realize this embodiment.

Fifth Embodiment

Next, the fifth embodiment will be described.

In the first embodiment, the secondary disk system 300 is provided in correspondence with the primary disk system 200. The update information reflecting instruction program 410 executed by the secondary CPU 400 establishes the situation that the write data having the write time equal to or before the standard time is written in a plurality of secondary disk systems and the write data having the write time after the standard time is not written.

The fifth embodiment discloses a method of configuring the secondary system constituted of the secondary CPU and a plurality of secondary disk systems of the first embodiment, as a secondary system constituted of a single secondary disk system. This embodiment can configure the secondary system without using the secondary CPU. Only the difference of the fifth embodiment from the first embodiment will be described. The contents other than those described with reference to the fifth embodiment are all equivalent to those of the first embodiment.

Figure 13:
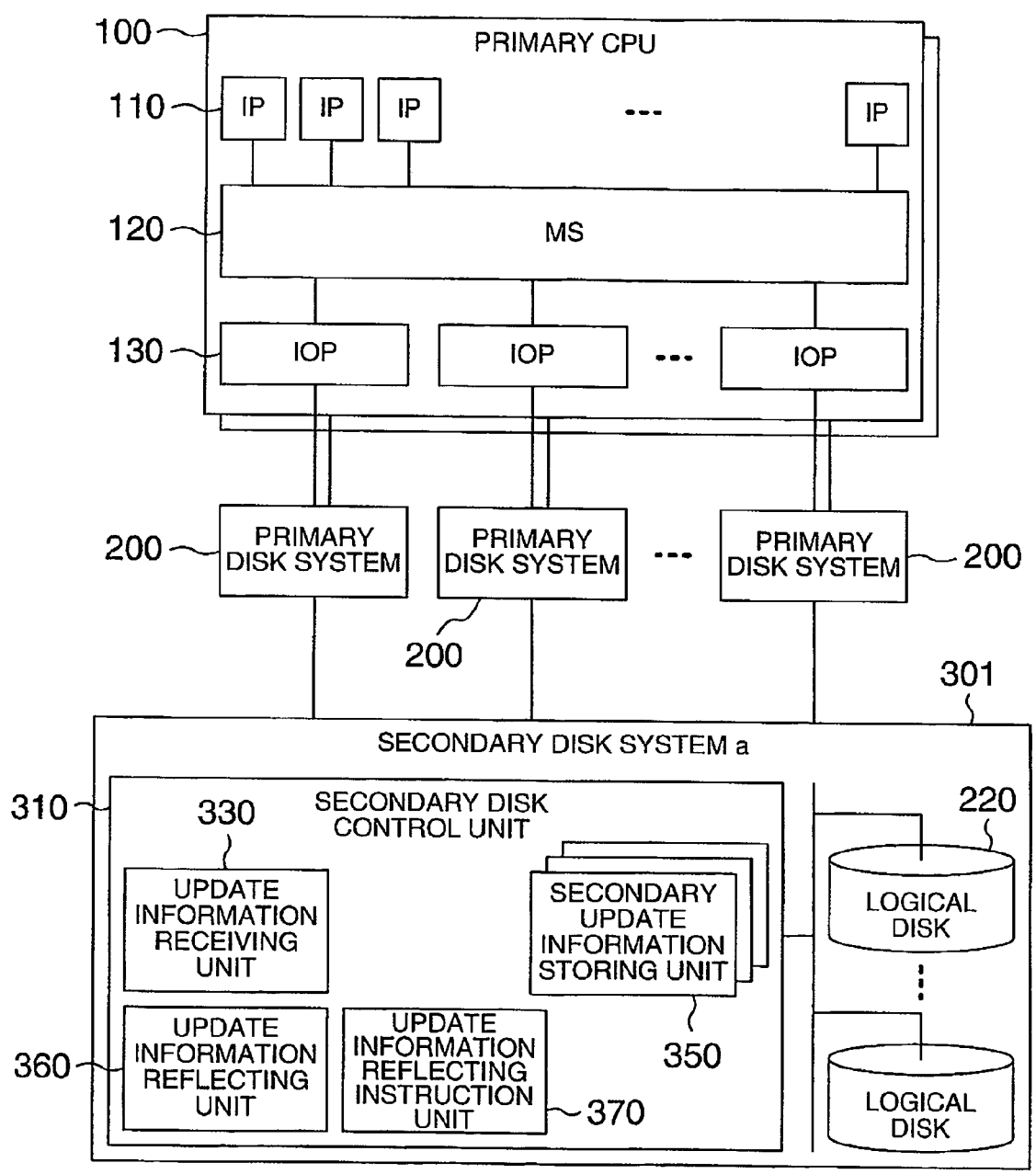
FIG. 13 is a diagram showing an example of a system configuration.

FIG. 13 is a diagram showing the structures of the whole system and a secondary disk system according to the fifth embodiment. A primary CPU 100 and primary disk systems 200 are equivalent to those of the first embodiment.

A secondary disk system a 301 has a secondary disk control unit 310 and logical disks 220. The logical disk 220 is equivalent to that of the first embodiment.

The secondary disk control unit 310 has an update information receiving unit 330, secondary update information storage units 350, an update information reflecting unit 360 and an update information reflecting instruction unit 370. The update information reflecting unit 360 is equivalent to that of the first embodiment.

In this embodiment, the secondary update information storage unit 350 is provided in the secondary disk control unit 310 in correspondence with the primary disk systems 200 connected to the secondary disk system a 301.

Similar to the first embodiment, the update information receiving unit 330 executes the processes shown in FIG. 6 each time it receives update information sent from the connected primary disk system 200. The storage destination of update information is one of the secondary update information storage units 350 corresponding to the primary disk system 200 from which the update information was sent.

The update information reflecting instruction unit 370 selects the latest times from the write times 510 possessed by the update information stored in each of the secondary update information storage units 350, selects the oldest time from the selected latest times to use it as the standard time. Next, the update information reflecting instruction unit 370 instructs the update information reflecting unit 360 to write write data in the update information having the write time equal to or before the standard time, in a logical disk 220 in the secondary disk system 300 indicated by an ID in the update information. The above-described processes are repeated while the secondary update information storage units 350 store update information.

As described above, one secondary disk control unit 310 has a plurality of secondary update information storage units, and the operation executed by the update information control program 410 of the first embodiment is executed by the update information reflecting instruction unit 370 so that the secondary system can be configured without the secondary CPU.

In the contents described above, update information is serially transferred. If update information is to be transferred parallel from the primary disk system 200 to secondary disk system a 301, the de-stage permission time stored in the secondary update information storage unit 350 is used to realize this embodiment.

The fifth embodiment may be applied to the third embodiment.

Sixth Embodiment

Next, the sixth embodiment will be described.

In the first embodiment, the update information reflecting instruction program 410 executed by the secondary CPU 400 establishes the situation that the write data having the write time equal to or before the standard time is written in a plurality of secondary disk systems and the write data having the write time after the standard time is not written.

The sixth embodiment discloses a method of configuring the secondary system constituted of the secondary CPU and a plurality of secondary disk systems of the first embodiment, as a secondary system constituted of a plurality of secondary disk systems.

This embodiment can configure the secondary system having a plurality of secondary disk systems without using the secondary CPU. Only the difference of the sixth embodiment from the first embodiment will be described. The contents other than those described with reference to the sixth embodiment are all equivalent to those of the first embodiment.

Figure 14:
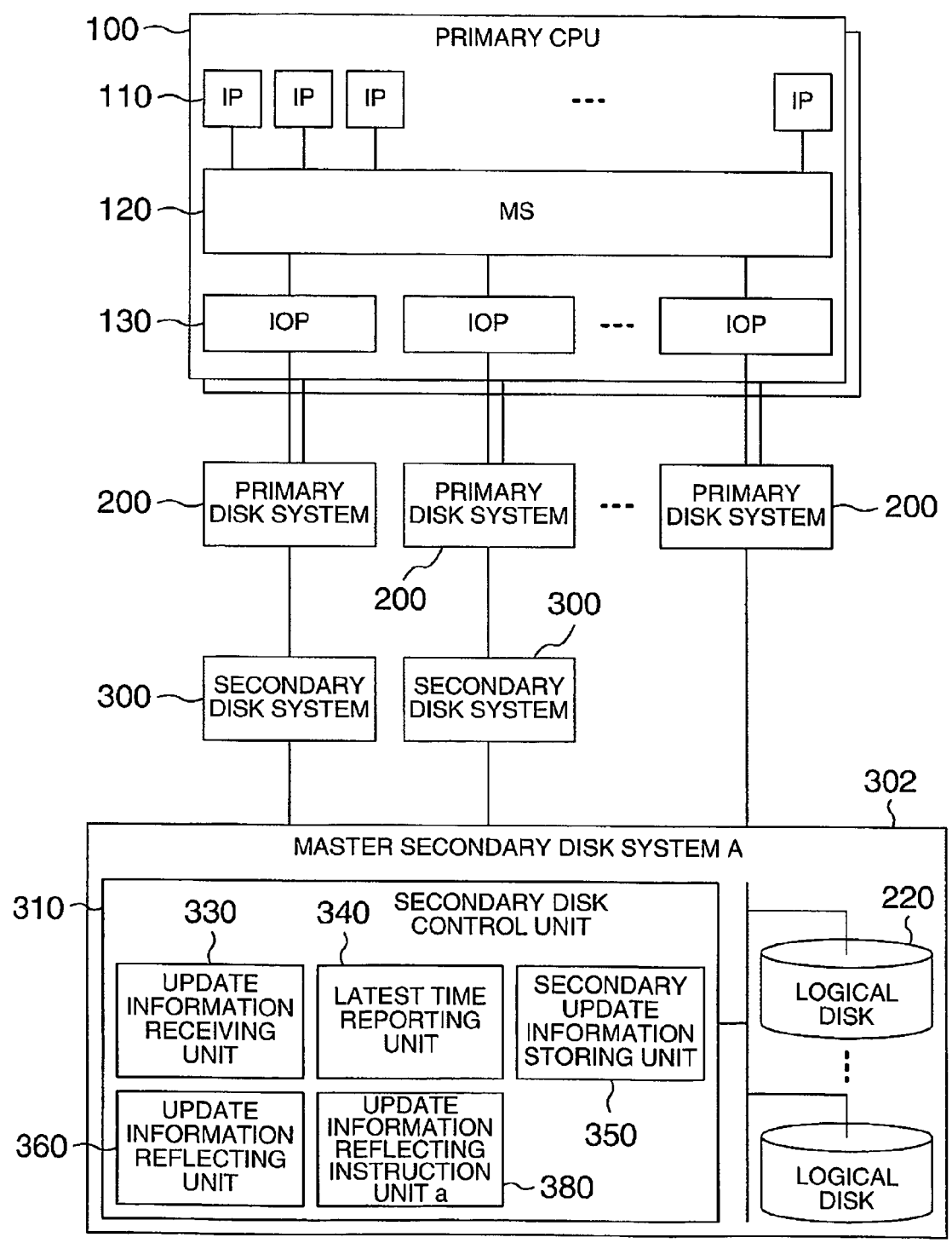
FIG. 14 is a diagram showing an example of a system configuration.

FIG. 14 is a diagram showing the structures of the whole system and secondary disk systems according to the sixth embodiment. A primary CPU 100, primary disk systems 200 and secondary disk systems 300 are equivalent to those of the first embodiment.

At least one of a plurality of secondary disk systems 300 is used as a master secondary disk system 302. The master secondary disk system 302 is connected to a corresponding one of the primary disk systems and to all secondary disk systems 300, and executes two types of processes. In one type, the master secondary disk system 302 receives update information from the primary disk system 200 and writes it in the logical disk 220 in accordance with the write time. In the other type, the master secondary disk system 302 communicates with all the secondary disk systems 300 to execute the processes made by the update information reflecting instruction program 410 of the first embodiment.

The master secondary disk system 302 has a secondary disk control unit 310 and logical disks 220. The logical disk 220 is equivalent to that of the first embodiment. The secondary disk control unit 310 has an update information receiving unit 330, a latest time reporting unit 340, a secondary update information storage unit 350, an update information reflecting unit 360 and an update information reflecting instruction unit a 380. The update information receiving unit 330, latest time reporting unit 340, secondary update information storage unit 350 and update information reflecting units 360 are equivalent to those of the first embodiment.

The update information reflecting instruction unit a 380 instructs each of the latest time reporting units 340 in all secondary disk systems 300 including the master secondary disk system 302 to report the latest time among the write times 510 contained in the update information possessed by each secondary disk system 300. Upon reception of the instruction from the update information reflecting instruction unit a 380, the latest time reporting unit 340 returns the latest time among the write times 510 contained in the update information in the secondary update information storage unit 350 to the update information reflecting instruction unit a 380.

Next, the update information reflecting instruction unit a 380 stands by until the latest time is reported from each of all secondary disk systems 300.

Next, the update information reflecting instruction unit a 380 selects the oldest time from all latest times reported from the secondary disk systems 300 and uses it as the standard time.

Next, the update information reflecting instruction unit a 380 instructs the update information reflecting unit 360 in each of all secondary disk systems 300 to write data in the update information having the write time 510 equal to or before the standard time, in the logical disk 220 in the secondary disk system 300 indicated by an ID in the update information. Upon reception of the instruction from the update information reflecting instruction unit a 380, the update information reflecting unit 360 writes only the write data in the update information having the write time 510 equal to or before the instructed standard time, in the logical disk 220 indicated by the secondary logical disk ID in the update information, and deletes the update information whose write data was written in the logical disk, from the secondary update information storage unit 350.

Next, the update information reflecting instruction unit a 380 stands by until all secondary disk systems 300 report a completion of the write instruction.

The above-described processes are repeated while the secondary update information storage units 350 store update information.

By using the master secondary disk system 302, the secondary system having a plurality of secondary disk systems 300 can be configured without the secondary CPU. The secondary disk system 300 which executes the processes of the master secondary disk system 302 may be designated in advance by a CPU connected to all secondary disk systems 302 or by a management terminal.

In the above description, the update information reflecting instruction unit a 380 of the master secondary disk system 302 issues an update instruction to all secondary disk systems 300 connected to the master secondary disk system 302. If a plurality of secondary disk systems 300 include a secondary disk system 300 not having the logical disk 220 designated as a secondary disk for a remote copy, the secondary disk systems 300 as the destination of the update instruction are designated in advance in the master secondary disk system 302. In this case, the update information reflecting instruction unit a 380 issues the update instruction only for those secondary disk systems 300 designated in advance. The secondary disk systems 300 to be used as the destination of the update instruction are designated from a management console of the master secondary disk system 302 or by a special input/output command entered from a CPU connected to the master secondary disk system 302. Parameters to be used for designating the secondary disk systems 300 by the management console or special input/output command include the secondary disk systems used as the destination of the update instruction by the master secondary disk system 302. If some logical disks 220 of the secondary disk systems 300, used as the destination of the update instruction, are designated as the secondary disks for the remote copy, the logical disks 220 designated as the secondary disks or a set of these logical disks may be included in the parameters.

In the contents described above, update information is serially transferred. If update information is to be transferred in parallel from the primary disk system 200 to secondary disk system a 301, the latest time reporting unit 340 reports the de-stage permission time to the update information reflecting instruction unit a 380 to realize this embodiment.

The sixth embodiment may be applied to the third embodiment.

It should be further understood by those skilled in the art that although the foregoing description has been made in conjunction with the above-described example embodiments of the invention, the invention is not to be construed as being limited thereto and that various changes and modifications may be made, also, without departing from the spirit of the invention and the scope of the appended claims.

What we claim is:

1. A method for a remote copy system which comprises:
a first computer;
a plurality of first storage systems connected to said first computer;
a second computer; and
a plurality of second storage systems connected to a second computer;
wherein:
each of said plurality of first storage systems comprises a first storage unit and a first storage control unit connected to said first storage unit;
each of said plurality of second storage systems comprises a second storage unit and a second storage control unit connected to said second storage unit;
each of said plurality of first storage systems is coupled to one of said plurality of second storage systems,
the method comprising the steps of:
on a side of said first storage control unit,
receiving a plurality of write requests including write times from said first computer, writing write data in each write request in said first storage unit in an order of the write request having an older write time, transmitting a completion of a write process to said first computer, and transmitting the write requests to said second storage control unit connected to said first storage control unit in an order of an older write time;

on a side of said second storage control unit, receiving the write requests from said first storage control unit connected to said second storage unit, storing the write requests in a secondary update information storage unit possessed by said second storage control unit in the order of the older write time, and transmitting a completion report to said first storage control unit connected to said second storage control unit;

on a side of said second computer, determining a standard time to be used for said second storage control unit to determine whether the write data in each write request is stored in said second storage unit, and also determining a subsidiary standard time which is the latest time from all times reported from all of the second storage systems when the standard time is determined;

on the side of said second storage control unit, writing the write data in each write request having a write time equal to or before said standard time;

inquiring to said first storage control unit as to whether it has received a new write request from the first computer, and, if the second storage control unit receives a notice from said first storage control unit which notice indicates that said first storage control unit did not receive a new write request from the first computer, sending the subsidiary standard time to said second computer, so that said second computer can update the standard time.

2. The method of claim 1, comprising the further steps of:
on a side of each of said plurality of second storage control unit, reporting to said second computer a latest time among write times contained in the plurality of write requests received from said first storage control unit connected to said second storage control unit; and
on the side of said second computer, determining said standard time to be used for said second storage control unit to determine whether the write data in each write request is written in said second storage unit, from a plurality of write times received from each of said plurality of second storage control units.

3. The method of claim 2, comprising the further step of, on the side of said second computer, using as said standard time an oldest time among the plurality of write times received from each of said plurality of second storage control units.

4. The method of claim 1, comprising the further steps of:
on a side of each of said plurality of first storage control units,
managing whether a completion report is received from said second storage control unit relative to each write request transmitted to said second storage control unit, and transmitting an oldest time among write times in write requests for which completion reports are not received, to said second storage control unit.

5. The method of claim 4, comprising the further steps of:
on the side of each of said plurality of second storage control units, reporting to said second computer a latest time among a plurality of oldest times received from said first storage control unit connected to the second storage control unit; and on the side of said second computer, determining said standard time from a plurality of write times received from each of said plurality of second storage control units, said standard time being used for said second storage control unit to determine whether write data in a write request is written in said storage unit.

6. The method of claim 1, comprising the further step of, on the side of said second computer determining said standard time from a predetermined calculation equation which adds a margin to a present time of a timer in the second computer to determine said standard time.

7. The method of claim 6, comprising the further steps of, on a side of each of said plurality of second storage control units, upon reception of a write request including a write time equal to or before said standard time from said first storage control unit, transmitting a completion report to said second computer, and on the side of said second computer, determining a new standard time after said completion report is received from all of said second storage control units.

8. The method according to claim 6, wherein said margin is based on a minimum margin equal to a times a safety factor greater than 1, wherein a equals a maximum time taken for an update information reflecting program to supply the standard time to update information reflecting units of all of the storage systems plus a time difference between timers of the first and second computer.

9. A method for a remote copy system which comprises:
a plurality of first storage systems connected to a first computer; and
a plurality of second storage systems connected to a second computer;
wherein:
each of said plurality of first storage systems comprises a first storage unit and a first storage control unit connected to said first storage unit;
each of said plurality of second storage systems comprises a second storage unit and a second storage control unit connected to said second storage unit;
each of said plurality of first storage systems is coupled to one of said plurality of second storage systems;
the method comprising the steps of:
on a side of said first storage control unit,
receiving a plurality of write requests including write times from said first computer,
writing write data in each write request in said first storage unit in an order of the write request having an older write time contained in each of said plurality of write requests, and
transmitting a completion of a write process to said first computer, and
transmitting the write requests to said second storage control unit connected to said first storage control unit in an order of an older write time;
on a side of said second storage control unit,
receiving the write requests from said first storage control unit connected to said second storage unit,
storing the write requests in a secondary update information storage unit possessed by said second storage control unit in the order of the older write time,
transmitting a completion report to said first storage control unit connected to said second storage control unit,
receiving a standard time determined by said second computer and being used for said second storage control unit to determine whether the write data in each write request is stored in said second storage unit, wherein said second computer also determines a subsidiary standard time which is the latest time from all times reported from all of the second storage systems when the standard time is determined, writing write data in each write request in said second storage unit in accordance with a write request having a write time equal to or before said standard time, and inquiring to said first storage control unit as to whether it has received a new write request from the first computer, and, if the second storage control unit receives a notice from said first storage control unit which notice indicates that said first storage control unit did not receive a new write request from the first computer, sending the subsidiary standard time to said second computer, so that said second computer can update the standard time.

10. The method of claim 9, comprising the further steps of:

on a side of each of said plurality of second storage control units, reporting to said second computer a latest write time among write times contained in each of said plurality of received write requests; and on a side of each of said plurality of second storage control units, receiving said standard time determined by said second computer from a plurality of write times received from each of said plurality of storage control units, said standard time being used for each of said plurality of second storage control units to determine whether the write data in each write request is written in said second storage unit.

11. The method of system of claim 9, comprising the further steps of:

on a side of each of said plurality of second storage control units, receiving said standard determined from a predetermined calculation equation which adds a margin to a present time of a timer in the second computer to determine said standard time; and on a side of, upon reception of a write request including a write time equal to or before said standard time from said first storage control unit connected to second storage control unit, transmitting a completion report to said second computer, and receiving a new standard time determined after said completion report is received from all of said second storage control units.

12. The method according to claim 11, wherein said margin is based on a minimum margin equal to a times a safety factor greater than 1, wherein a equals a maximum time taken for an update information reflecting program to supply the standard time to update information reflecting units of all of the storage systems plus a time difference between timers of the first and second computer.

13. The method of claim 9, comprising the further steps of:

on a side of each of said plurality of second storage control units, instructing said first storage control unit connected to said second storage control unit to transmit a write request.

14. The method of claim 9, wherein:

the write request received at said first storage control unit from said first computer includes an address of said first storage unit for storing the write data in accordance with the write request; and in accordance with said address, said first storage control unit determines an address of said second storage unit for storing the write data in accordance with the write data, and transmits the determined address of said second storage unit added with the write request, to said second storage control unit.

15. The method of claim 9, wherein:

each of said plurality of first storage systems includes a primary update information storage unit; and the write request received from said first computer is stored in said primary update information storage unit in the order of an older write request.

16. The method of claim 15, wherein:

each of said plurality of first storage systems includes an update information transmitting unit; and said update information transmitting unit reads a plurality of write requests stored in said update information storage unit in the order of an older write time contained in each write request and transmits the read write request to said second storage unit.

17. The method of claim 16, wherein upon reception of the completion report of a write request transmitted from said second storage control unit connected to said first storage control unit, said update information transmitting unit deletes the write request corresponding to the completion report from said update information storage unit storing write requests.

18. The method of claim 9, wherein:

each of said plurality of second storage systems includes an update information receiving unit; and upon reception of the write request from said first storage system, said update information receiving unit arranges the received write request in the order of an older write time, stores the write request in said secondary update information storage unit, and transmits the completion report to said first storage system.

19. The method of claim 9, wherein:

each of said plurality of second storage systems includes a latest time reporting unit; and said latest time reporting unit receives an instruction from said second computer, and reports to said second computer a latest write time among write times contained in each write request and stored in said secondary update information storage unit.

20. The method of claim 9, wherein:

each of said plurality of second storage systems includes an update information reflecting unit; and upon reception of said standard time from said second computer, said update information reflecting unit writes write data in a write request having a write time equal to or before said standard time, in said second storage unit.

21. The method of claim 20, wherein said update information reflecting unit deletes the write data from said secondary update information storage unit, the write data in the write request having been written in said second storage unit.

* * * * *